United States Patent
Kino et al.

(10) Patent No.: US 7,955,005 B2
(45) Date of Patent: Jun. 7, 2011

(54) ROLL ROTATION MECHANISM

(75) Inventors: Manabu Kino, Azumino (JP);
Yoshihide Kiyosawa, Azumino (JP)

(73) Assignee: Harmonic Drive System Inc., Tokyo (JP)

( * ) Notice: Subject to any disclaimer, the term of this patent is extended or adjusted under 35 U.S.C. 154(b) by 1091 days.

(21) Appl. No.: 11/734,128

(22) Filed: Apr. 11, 2007

(65) Prior Publication Data

US 2007/0265102 A1   Nov. 15, 2007

(30) Foreign Application Priority Data

May 15, 2006   (JP) .................................. 2006-135568

(51) Int. Cl.
*G03B 1/00* (2006.01)

(52) U.S. Cl. .......... 396/411; 396/418; 492/15; 242/334; 242/349

(58) Field of Classification Search .................. 396/418, 396/411; 242/334, 349; 492/15
See application file for complete search history.

(56) References Cited

U.S. PATENT DOCUMENTS

| | | | | |
|---|---|---|---|---|
| 2,704,969 A | * | 3/1955 | Mische | 396/411 |
| 3,316,738 A | * | 5/1967 | Bishop | 464/103 |
| 3,448,669 A | * | 6/1969 | Minoru | 396/403 |
| 4,680,843 A | * | 7/1987 | Junk et al. | 492/10 |
| 4,959,672 A | * | 9/1990 | Yoshino et al. | 396/418 |
| 5,596,384 A | * | 1/1997 | Tanaka et al. | 396/413 |
| 5,649,254 A | * | 7/1997 | Mori et al. | 396/411 |
| 5,905,916 A | * | 5/1999 | Kamata | 396/6 |
| 6,085,043 A | * | 7/2000 | Okuno | 396/132 |
| 6,170,999 B1 | * | 1/2001 | Okuno | 396/413 |
| 6,215,958 B1 | * | 4/2001 | Ichino et al. | 396/48 |
| 6,295,420 B1 | * | 9/2001 | Katagiri et al. | 396/387 |
| 6,317,564 B1 | * | 11/2001 | Ichino et al. | 396/85 |
| 6,336,751 B1 | * | 1/2002 | Shibayama | 396/411 |
| 6,529,688 B2 | * | 3/2003 | Kaihara et al. | 396/132 |
| 6,564,013 B2 | * | 5/2003 | Kaihara | 396/132 |
| 6,929,408 B2 | * | 8/2005 | Hosokawa et al. | 396/358 |

FOREIGN PATENT DOCUMENTS

| | | | |
|---|---|---|---|
| JP | 04329834 A | * | 11/1992 |
| JP | 06-273766 A2 | | 9/1994 |
| JP | 2007303656 A | * | 11/2007 |

* cited by examiner

*Primary Examiner* — Essama Omgba
(74) *Attorney, Agent, or Firm* — Buchanan Ingersoll & Rooney PC

(57) ABSTRACT

In a roll rotation mechanism (1) for continuously causing a film-rolling roll to rotate at a constant rate, an Oldham coupling (4) is interposed in a transmission path between a wave gear reduction mechanism (3) and a roll (10). The Oldham coupling (4) forms a connection between a gear rotation output shaft (34) and a roll rotation shaft (11) in a state in which latitude of movement α is present about a central axis line (4a). When a roll (10) is continuously rotated at a constant rate, the Oldham coupling (4) is held in a state in which no latitude of movement is present in a rotation direction R and latitude of movement α is present in a direction opposite the rotation direction; and rotation torque is transmitted. Due to the presence of the latitude of movement α, a vibration transmission path is blocked in the Oldham coupling (4), vibrations are not transmitted from the wave gear reduction mechanism (3) to a roll (19), a vibration system does not resonate, and no incidence of large rotational fluctuation occurs in the roller.

3 Claims, 2 Drawing Sheets

(c)

(b)   (d)   (a)

ROLL ROTATION MECHANISM

FIELD OF THE INVENTION

The present invention relates to a roll rotation mechanism used to continuously rotate a roll at a constant rate for winding up a film or a roll used in another application. More specifically, the present invention relates to a roll rotation mechanism for rotating a roll at a constant rate by reduced-rate rotation obtained via a gear-type reduction mechanism.

BACKGROUND ART

A rotation mechanism for a roll used to wind up film must be able to continuously rotate the roll at a constant rate so that the film will be rolled up tightly at a constant tensile force around an outer peripheral surface of the roll. When a gear-type reduction mechanism is used for the rotation mechanism, a vibration system including the rotation mechanism and the roll starts to vibrate due to angular transmission error in the rotation mechanism. When the resulting vibration matches an intrinsic vibration frequency of the vibration system, a state of resonance is created, large variation occurs in the rate at which the roll is rotated, and the film cannot be wound up in a suitable fashion.

In particular, when a wave gear reduction mechanism is used, a flexible external gear and a rigid internal gear are repeatedly engaged and disengaged with one another while portions of the flexible external gear are repeatedly flexed in a radial direction by the wave drive generator. For example, when the flexible external gear is flexed into an elliptical shape using an elliptical wave generator, the portions of the flexible external gear are flexed two cycles for every one rotation of the wave generator. Inherent rotational fluctuations are generated in the wave gear reduction mechanism due to such flexing.

In the roll rotation mechanism using the gear-type reduction mechanism, fluctuations in rate caused by angular transmission error in the reduction mechanism are magnified in the vibration system of the roll rotation mechanism, and the variations in rate are likely to increase. For this reason, the roll is not readily allowed to rotate continuously at a constant rate. Traction drive-type reduction mechanism, which have low rotational fluctuation, are used in the prior art for the roll rotation mechanism for allowing the roll to continuously rotate at a constant rate.

The invention disclosed in Patent Document 1 is an example of a roll rotation mechanism. The roller rotation mechanism disclosed therein has a configuration wherein the rate of rotation from a motor is reduced via a gear reduction mechanism composed of a pulley and a belt, and is transmitted to a roller rotation shaft via an Oldham coupling.

[Patent Document 1] JP-A 6-273766.

Traction drive-type reduction mechanisms are generally more expensive than gear-type reduction mechanisms. Belt/pulley-types cannot be mounted on a roll rotating shaft in a concentric state, and must have an installation space maintained at an external periphery.

SUMMARY OF THE INVENTION

In view of the foregoing points, it is an object of the present invention to provide a roll rotation mechanism that can continuously rotate a roll at a constant rate using a gear-type reduction mechanism.

In order to achieve the above and other objects, according to the present invention, there is provided a roll rotation mechanism which is used to continuously rotate a roll at a constant rate, comprising: a motor; a gear-type reduction mechanism for reducing the rate of output rotation of the motor; and a shaft coupling for transmitting the reduced-rate output rotation of the gear-type reduction mechanism to the roll; wherein the shaft coupling forms a connection between a drive-side shaft part positioned on a side of the gear-type reduction mechanism and a driven-side shaft part positioned on a side of the roll in such a state as to have latitude of movement about a central axis of the shaft coupling.

In the roll rotation mechanism of the present invention, a member provided with latitude of movement about a central axis is used for the coupling shaft disposed in a rotational force transmission path between the gear-type reduction mechanism and the roll. When the roll is continuously rotated at a constant rate, the coupling shaft does not have latitude of movement in the rotation direction, but is instead held in a state in which latitude of movement is present in a direction opposite the rotation direction, and rotational torque is transmitted. However, since latitude of movement is present, a vibration transmission path is blocked in a portion of the coupling shaft. Accordingly, vibrations are not transmitted from the gear-type reduction mechanism to the roll. Therefore, the roll and the vibration system of the rotation mechanism of the roll will not resonate with the vibration of the gear-type reduction mechanism, and large rotational fluctuations are prevented from occurring in the roll. As a result, a state can be maintained in which the roll is continuously rotated at a constant rate.

An Oldham coupling can be used for the coupling shaft. The Oldham coupling has a drive-side circular disc mounted to the drive-side shaft part in a concentric state; a driven-side circular disc mounted to the driven-side shaft part in a concentric state; an insert circular disc disposed between the drive-side circular disc and the driven-side circular disc; and the insert circular disc is connected to the drive-side circular disc and the driven-side circular disc in such a state as to have latitude of movement about a central axis; is connected to the drive-side circular disc so as to be able to slide in a diametric direction; and is connected to the driven-side circular disc so as to be able to slide in a diametric direction perpendicular to the abovementioned diameter direction.

A wave gear reduction mechanism can be used for the gear-type reduction mechanism. The wave gear reduction gear comprises a rigid internal-tooth gear; a flexible external-tooth gear concentrically disposed inside the rigid internal-tooth gear; and a wave generator for flexing the flexible external-tooth gear in a radial direction, causing partial engagement with the rigid internal-tooth gear and moving an engaging position of the gears in a circumferential direction in conjunction with rotation.

In the roll rotation mechanism of the present invention, a coupling shaft is interposed in a rotational force transmission path between the gear-type reduction mechanism and the roll, and a member having latitude of movement about a central axis line of the coupling shaft is used for the coupling shaft. The vibration transmission path of the roll rotation mechanism from the gear-type reduction mechanism to the roll is blocked by the coupling shaft. It is accordingly possible to avoid an unfavorable condition caused by the roll resonating due to the vibration of the gear-type reduction mechanism, which increases rotational fluctuations. For this reason, a roll rotation mechanism can be realized that is capable of continuously rotating a roll at a constant rate without variations in the rate using a gear-type reduction mechanism.

BEST MODE FOR CARRYING OUT THE INVENTION

Embodiments of a roll rotation mechanism that employs the present invention shall be described below with reference to the drawings.

Figure 1:
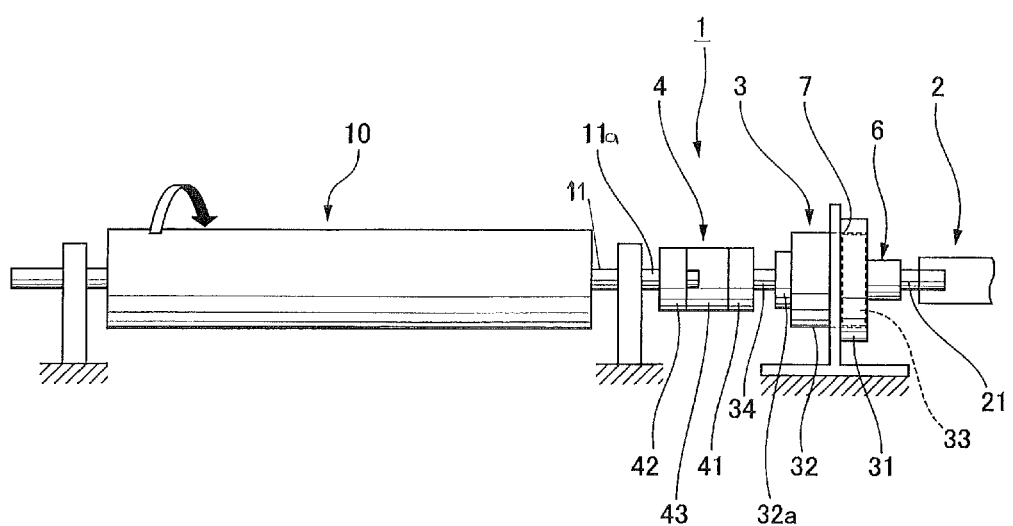
FIG. 1 is a schematic block diagram of a roll rotation mechanism that uses the present invention.
Figure 2:
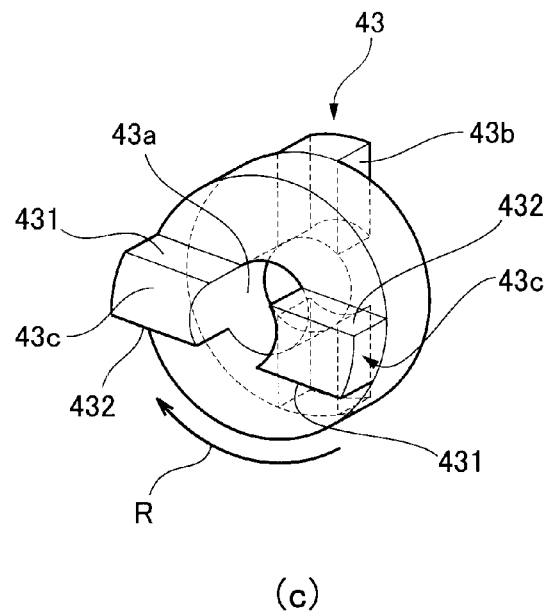
FIGS. 2A through 2D show an end view of an insert circular disc side of a drive-side circular disc in an Oldham coupling of the roll rotation mechanism of FIG. 1; an end view of an insert circular disc side of a driven-side circular disc; a perspective view of the insert circular disc; and a cross-sectional view of the insert circular disc.
Figure 2:
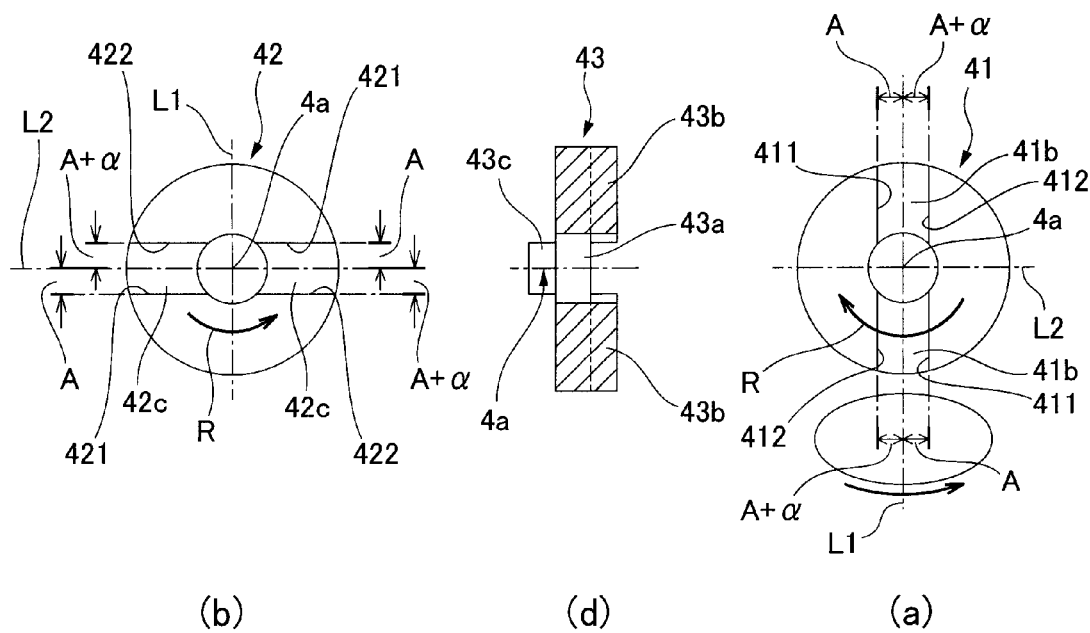

FIG. 1 is a schematic block diagram showing an example of a roll rotation mechanism that employs the present invention. A roll rotation mechanism 1 of the present example is used to continuously rotate a film-rolling roll 10 at a constant rate in the same direction. The roll rotation mechanism 1 comprises a motor 2, a wave gear reduction mechanism 3, and an Oldham coupling 4, wherein these members are connected in a coaxial state in the stated order. The output rotation of the motor 2 is reduced in rate via the wave gear reduction mechanism 3 and then transmitted to the film-rolling roll 10 via the Oldham coupling 4.

The wave gear reduction mechanism 3 comprises an annular rigid internal gear 31, a cup-shaped flexible external gear 32 disposed concentrically inside the rigid internal gear, and a wave generator 33 having an elliptical contour that fits into an interior of the flexible external-tooth gear 32. The cup-shaped flexible external gear 32 is flexed into an elliptical shape by the wave generator 33. An output shaft 21 of the motor 2 is connected and anchored to an end surface of the input side of the wave generator 3 in a coaxial state via a coupling 6. A thick disc-shaped boss 32a is formed on a portion that corresponds to a cup-shaped bottom of the cup-shaped flexible external gear 32. A reduced-rate rotation output shaft 34 (drive-side shaft part) is connected and anchored to the boss in a coaxial state.

The rigid internal gear 31 is anchored to a mounting frame 7 on an anchoring side. When the wave generator 33 is rotated at a high rate by the motor 1, an engagement position of the gears 31, 32 is moved in a circumferential direction. The gears 31, 32 differ in number of teeth in an amount of 2n (where n is a positive integer), and normally in an amount of 2 teeth, and relative rotation in the gears 31, 32 is generated by the difference in the number of teeth. The rigid internal gear 31 is anchored so as not to rotate. Therefore, the flexible external gear 32 rotates, and reduced-rate rotation is output from the reduced-rate rotational force shaft 34 connected to the flexible external gear 32.

The Oldham coupling 4 that forms the connection between the wave gear reduction mechanism 3 and the film-rolling roll 10 comprises a drive-side circular disc 41, a driven-side circular disc 42, and an insert circular disc 43 that is disposed between the drive-side circular disc and the driven-side circular disc. The reduced-rate rotation output shaft 34 is connected and anchored to an end surface on the reduced-rate-side of the drive-side circular disc 41 in a coaxial state. A shaft end part 11a (driven-side shaft part) on one side of a roll rotating shaft 11 extending from an end surface of one side of the film-rolling roll 10 is connected and coaxially anchored to a roll-side end surface of the driven-side circular disc 42. The Oldham coupling 4 of the present example is basically configured in the same manner as a commonly used Oldham coupling, but differs in that the three members are connected in such a state as to have latitude of movement about a central axis line of the coupling.

FIGS. 2A, 2B, 2C and 2D show an end view of the insert circular disc-side of the drive-side circular disc 41 of the Oldham coupling 4, an end view of the insert circular disc-side of the driven-side circular disc 42, a perspective view of the insert circular disc 43, and a cross-sectional view of the insert circular disc 43.

The insert circular disc 43 comprises a central hole 43a. A pair of protuberances 43b that extend in a direction of a diameter line L1, have rectangular cross sections, and are of fixed width 2A, is formed on an end surface of an input side. A pair of protuberances 43c that extend in a direction of a diameter line L2 perpendicular to the diameter line L1, have a rectangular cross section, and are of fixed width 2A, is formed on an end surface of an output side. The protuberances 43b on the input side are slidably inserted into a rectangular groove 41b formed on the end surface of the drive-side circular disc 41 on the input side. The protuberances 43c on the output side are slidably inserted into a rectangular groove 42c formed on the end surface of the driven-side circular disc 42 on the output side.

The rectangular groove 41b of the drive-side circular disc 41 on the input side has a width of (2A+α), has a width of A on a near side in the rotation direction R when the diameter line L1 is a center, and has a width (A+α) on the opposite side that is slightly larger than the width A by an amount α. The rectangular groove 42c of the driven-side circular disc 42 on the output side also has a width of (2A+α), has a width of A in the rotation direction R when the diameter line L2 is a center, and has a width (A+α) on the opposite side that is slightly larger than the width A by an amount α. As a result, the insert circular disc 43 is connected to the drive-side circular disc 41 and the driven-side circular disc 42 in such a state as to have latitude of movement α about the central axis line 4a.

An operation of the roll rotation mechanism 1 of the present example thus configured shall be described. The rate of rotation of the motor 2 is reduced via the wave reduction mechanism 3, and transmitted to the rotation shaft 11 of the roll 10 via the Oldham coupling 4.

Side surfaces 411 of the rectangular groove 41b of the drive-side circular disc 41 strike side surfaces of the protuberances 43b of the insert circular disc 43 between the drive-side circular disc 41 and the insert circular disc 43, and latitude of movement α can be created between side surfaces 412 on the opposite sides and corresponding side surfaces of the protuberances 43b. Side surfaces 431 of the protuberances 43c of the insert circular disc 43 in the rotation direction R strike side surfaces 421 of the rectangular groove 42a of the driven-side circular disc 42 between the insert circular disc 43 and the driven-side circular disc 42, and latitude of movement α can be created between side surfaces 432 on the opposite sides and side surfaces 422 of the protuberances 42c.

Therefore, in a rotating state, the vibration transmission path between the wave gear reduction gear 3 and the roll 10 is in effect blocked at the Oldham coupling 4, and vibration generated by the wave gear reduction mechanism 3 is not transmitted to the roll 10. In addition, even if the vibration is transmitted, no adverse effects will arise in regard to having the vibration system resonate, and dramatic rotational fluctuation generated in the roll 10. For this reason, the roll 10 can be continuously rotated at a constant rate without rotational fluctuations.

Another Embodiments

An Oldham coupling was used in the above-described example. However, any coupling may be used as long as the coupling can form a connection between the drive-side circular disc and the driven-side circular disc in such a state as to allow for latitude of movement about the central axis line. In addition, a type of gear-type reduction mechanism other than a wave gear reduction mechanism can be used. Furthermore, the above-described example relates to a roll rotation mechanism for a film-winding roll. However, it is apparent that the present invention can also be used in a roll rotation mechanism for continuously rotating a roll at a constant rate other than a film-rolling roll.

The invention claimed is:

1. A roll rotation mechanism which is used to continuously rotate a roll at a constant rate, comprising:
    a motor;
    a gear-type reduction mechanism for reducing the rate of output rotation of the motor; and
    a shaft coupling for transmitting the reduced-rate output rotation of the gear-type reduction mechanism to the roll; wherein
    the shaft coupling forms a connection between a drive-side shaft part positioned on a side of the gear-type reduction mechanism and a driven-side shaft part positioned on a side of the roll in such a state as to have latitude of movement about a central axis of the shaft coupling, and wherein
    when the roll is continuously rotated at a constant rate, the latitude of movement of the shaft coupling is not present in a rotational direction of the roll so that rotational torque is transmitted via the shaft coupling, but is present in a direction opposite to the rotational direction so that a vibration transmission path via the shaft coupling is blocked.

2. The roll rotation mechanism of claim 1, wherein
the shaft coupling is an Oldham coupling;
the Oldham coupling has
a drive-side circular disc mounted to the drive-side shaft part in a concentric state;
a driven-side circular disc mounted to the driven-side shaft part in a concentric state;
an insert circular disc disposed between the drive-side circular disc and the driven-side circular disc; and
the insert circular disc is connected to the drive-side circular disc and the driven-side circular disc in such a state as to have latitude of movement about a central axis; is connected to the drive-side circular disc so as to be able to slide in a diametric direction; and is connected to the driven-side circular disc so as to be able to slide in a diametric direction perpendicular to the abovementioned diameter direction.

3. The roll rotation mechanism of claim 2, wherein
the gear-type reduction mechanism is a wave gear reduction mechanism comprising:
a rigid internal gear;
a flexible external gear concentrically disposed inside the rigid internal gear; and
a wave generator for flexing the flexible external gear in a radial direction, causing partial engagement with the rigid internal gear and moving an engaging position of the gears in a circumferential direction in conjunction with rotation.

* * * * *